(12) United States Patent
Zhang et al.

(10) Patent No.: US 8,956,203 B2
(45) Date of Patent: Feb. 17, 2015

(54) NOISE-REDUCED ABRASIVE ARTICLES (71) Applicants: Han Zhang, Shrewsbury, MA (US); Philippe Kerdraon, Melicocq (FR); Marc Rehfeld, Ezanville (FR)

(72) Inventors: Han Zhang, Shrewsbury, MA (US); Philippe Kerdraon, Melicocq (FR); Marc Rehfeld, Ezanville (FR)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 197 days.

(21) Appl. No.: 13/629,419

(22) Filed: Sep. 27, 2012

(65) Prior Publication Data
US 2013/0095735 A1    Apr. 18, 2013

Related U.S. Application Data (60) Provisional application No. 61/539,688, filed on Sep. 27, 2011.

(51) Int. Cl.
B24D 5/04     (2006.01)
B24D 11/02    (2006.01)
C09K 3/14     (2006.01)
B24D 13/14    (2006.01)

(52) U.S. Cl.
CPC .............. *B24D 11/02* (2013.01); *C09K 3/1409* (2013.01); *B24D 13/147* (2013.01)
USPC .......................................... 451/546; 451/544

(58) Field of Classification Search
CPC .... B24D 11/003; B24D 18/00; B24D 18/009; B24D 11/00; B24D 11/001; B24D 13/14; B24D 18/0027; B24D 18/0072; B24D 3/32; B24D 7/12; B24D 7/14
USPC .......................... 451/544, 546, 541, 533, 536
See application file for complete search history.

(56) References Cited

U.S. PATENT DOCUMENTS

| | | | | |
|---|---|---|---|---|
| 2,259,345 A | * | 10/1941 | Kuzmick et al. | 451/546 |
| 2,745,224 A | * | 5/1956 | Erickson | 451/536 |
| 3,716,950 A | | 2/1973 | McClure | |
| 4,062,153 A | * | 12/1977 | Malm | 451/544 |
| 4,615,151 A | * | 10/1986 | Huber et al. | 51/293 |
| 5,092,082 A | * | 3/1992 | Padberg et al. | 451/548 |

FOREIGN PATENT DOCUMENTS

JP        10286775 A    10/1998

* cited by examiner

*Primary Examiner* — Robert Rose
(74) *Attorney, Agent, or Firm* — Joseph P. Sullivan; Abel Law Group, LLP (57) ABSTRACT

Abrasive articles comprising a reduction layer configured to reduce noise level when the abrasive articles are in use.

20 Claims, 3 Drawing Sheets

NOISE-REDUCED ABRASIVE ARTICLES

CROSS-REFERENCE TO RELATED APPLICATION(S)

The present application claims priority from U.S. Provisional Patent Application No. 61/539,688, filed Sep. 27, 2011, entitled "NOISE-REDUCED ABRASIVE ARTICLES," naming inventors Han Zhang, Philippe Kerdraon, and Marc Rehfeld, which application is incorporated by reference herein in its entirety.

FIELD OF THE INVENTION

This invention relates to abrasive articles, and more particularly, to noise-reduced abrasive articles.

BACKGROUND

Abrasive articles, such as coated abrasives and bonded abrasives, are used in various industries to machine workpieces, such as by cutting, grinding, finishing, and polishing, both in hand-held and industrial applications. Machining processes that use abrasive articles span a wide industrial scope from automotive paint repair industries, to metal fabrication industries, to jet engine fabrication industries. In each of these examples, manufacturing facilities use abrasives to remove bulk material or affect surface characteristics of products.

Abrasive articles may comprise an organic matrix composite which may include one or more of the following ceramic grains; active or inactive inorganic fillers; organic resins such as modified or un-modified resins, polymers, or epoxies; and reinforcements.

SUMMARY OF THE INVENTION

Disclosed are noise-reduced abrasive articles. In certain embodiments, an abrasive article is presented comprising two stacks coupled to one another, each stack comprising an abrasive layer coupled to a mesh layer and a reduction layer, where the surface area of one face of the reduction layer is less than the surface area of the abrasive layer and at least a portion of the abrasive layers of each stack are chemically bonded to one another. In certain embodiments, the abrasive article comprises a diameter between about 100 mm and about 400 mm and a thickness between about 3 mm to about 10 mm.

In still other embodiments, the surface area of one face of the reduction layer is between about 25% and about 80% of the surface area of one face of the abrasive layer. The reduction layer may comprise PTFE, epoxy, thermosets, polymer sheet, thin polymer sheet with inert coating, non-woven fiber mat, or paper.

In some embodiments, an abrasive article is presented comprising: two abrasive layers; and a reduction layer between the abrasive layers; where the surface area of one face of the reduction layer is less than the surface area of one face of an abrasive layer and at least a portion of the abrasive layers are chemically bonded to one another. In certain embodiments, the abrasive article comprises a diameter between about 100 mm and about 400 mm and a thickness between about 3 mm to about 10 mm. In still other embodiments, the surface area of one face of the reduction layer is between about 25% and about 80% of the surface area of one face of the abrasive layer. The reduction layer may comprise PTFE, epoxy, thermosets, polymer sheet, thin polymer sheet with inert coating, non-woven fiber mat, or paper.

In other embodiments, an abrasive article is presented comprising: two stacks, each stack comprising: an abrasive layer comprising two faces, where each face comprises a surface area; two mesh layers, where one mesh layer is coupled to each face of the abrasive layer; two reduction layers, where one reduction layer is coupled to each mesh layer and each face of the abrasive layer, and where the surface area of each reduction layer is less than the surface area of one face of the abrasive layer; where the stacks are coupled together such that at least a portion of the abrasive layers are bonded to one another.

In still other embodiments, the surface area of one face of the reduction layer is between about 25% and about 80% of the surface area of one face of the abrasive layer. The reduction layer may comprise PTFE; epoxy, thermosets, polymer sheet, thin polymer sheet with inert coating, non-woven fiber mat, or paper.

In still additional embodiments, an abrasive article is presented comprising a first stack comprising an abrasive layer coupled to a mesh layer and a reduction layer, where the surface area of one face of the reduction layer is less than the surface area of the abrasive layer, and the layers are ordered in a first arrangement; and a second stack coupled to the first stack, the second stack comprising an abrasive layer coupled to a mesh layer and a reduction layer, where the surface area of one face of the reduction layer is less than the surface area of the abrasive layer, and the layers are ordered in a second arrangement; where the first arrangement is different than the second arrangement.

In other embodiments, an abrasive article is presented comprising: a first stack comprising an abrasive layer a coupled to a mesh layer V and a reduction layer P, where the surface area of one face of the reduction layer P is less than the surface area of the abrasive layer a, and the layers are ordered in a first arrangement selected from the group PVaVP, VaVP, VPaPV, VaVPP, VaPPV, aVPP, aPPV, aVP or aPV; and a second stack coupled to the first stack, the second stack comprising an abrasive layer a coupled to a mesh layer V and a reduction layer P, where the surface area of one face of the reduction layer P is less than the surface area of the abrasive layer a, and the layers are ordered in a second arrangement a second arrangement selected from the group PVaVP, VaVP, VPaPV, VaVPP, VaPPV, aVPP, aPPV, aVP or aPV; where the first arrangement is different than the second arrangement.

The term "coupled" is defined as connected, although not necessarily directly, and not necessarily mechanically.

The terms "a" and "an" are defined as one or more unless this disclosure explicitly requires otherwise.

The term "substantially" and its variations (e.g. "approximately" and "about") are defined as being largely but not necessarily wholly what is specified (and include wholly what is specified) as understood by one of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. For example, an abrasive article that includes two stacks possesses at least two stacks, and also may possess more than two stacks.

Furthermore, a device or structure that is configured in a certain way is configured in at least that way, but may also be configured in ways that are not listed. Metric units may be derived from the English units provided by applying a conversion and rounding to the nearest millimeter.

The feature or features of one embodiment may be applied to other embodiments, even though not described or illustrated, unless expressly prohibited by this disclosure or the nature of the embodiments.

Any embodiment of any of the disclosed devices and methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Other features and associated advantages will become apparent with reference to the following detailed description of specific embodiments in connection with the accompanying drawings.

BRIEF DESCRIPTION OF THE DRAWINGS

The following drawings illustrate by way of example and not limitation. For the sake of brevity and clarity, every feature of a given structure may not be labeled in every figure in which that structure appears. Identical reference numbers do not necessarily indicate an identical structure. Rather, the same reference number may be used to indicate a similar feature or a feature with similar functionality, as may non-identical reference numbers. The embodiments of the present grains shown in the figures are drawn to scale.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
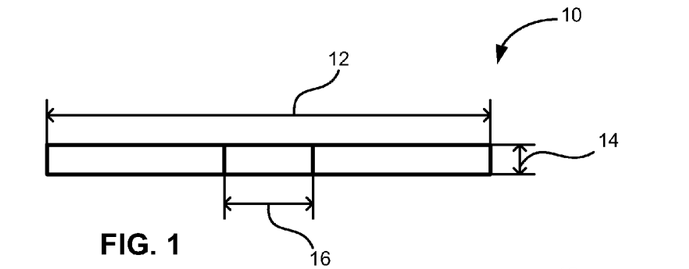
FIG. 1 illustrates a side sectional view of embodiments of an abrasive article.

FIGS. 1-4 illustrate embodiments of a grinding wheel 10. FIG. 1 shows a side view of embodiments of grinding wheel 10 having a diameter 12, a thickness 14, and a hole diameter 16. Embodiments of grinding wheel 10 shown in FIG. 1 may be Type 1 and/or Type 41 grinding wheels according to ISO 525, Bonded abrasive products—General requirements, International Organization for Standardization and/or EN 12413 European Standard—Safety requirements for bonded abrasive products, European Committee for Standardization, incorporated herein by reference.

Figure 2:
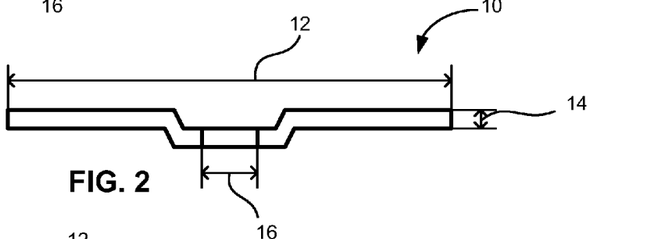
FIG. 2 illustrates a side sectional view of embodiments of an abrasive article.

FIG. 2 shows a side view of embodiments of grinding wheel 10 having a diameter 12, a thickness 14, and a hole diameter 16. Embodiments of grinding wheel 10 shown in FIG. 2 may be Type 27 and/or Type 42 grinding wheels according to ISO 525 and/or EN 12413.

Figure 3:
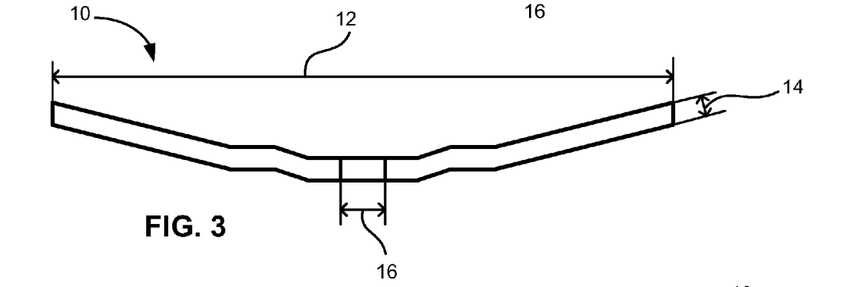
FIG. 3 illustrates a side sectional view of embodiments of an abrasive article.

FIG. 3 shows a side view of embodiments of grinding wheel 10 having a diameter 12, a thickness 14, and a hole diameter 16. Embodiments of grinding wheel 10 shown in FIG. 3 may be Type 28 grinding wheels according to ISO 525 and/or EN 12413.

Figure 4:
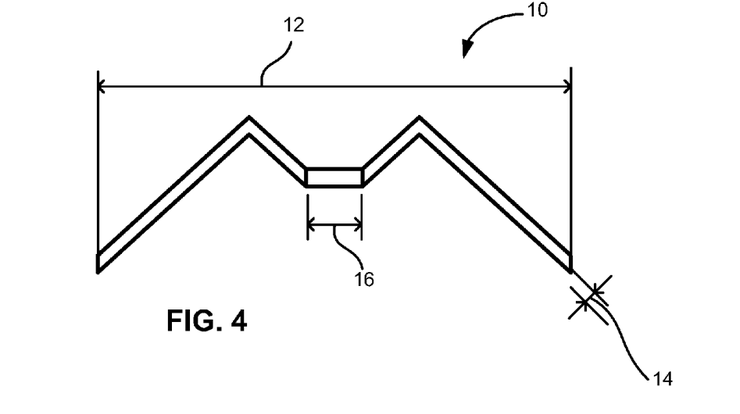
FIG. 4 illustrates a side sectional view of embodiments of an abrasive article.

FIG. 4 shows a side view of embodiments of grinding wheel 10 having a diameter 12, a thickness 14, and a hole diameter 16. Embodiments of grinding wheel 10 shown in FIG. 2 may be Type 29 grinding wheels according to ISO 525 and/or EN 12413.

In various embodiments, diameter 12 may range from about 100 mm to about 400 mm, and may be less than about 110 mm, 120 mm, 130 mm, 140 mm, 150 mm, 160 mm, 170 mm, 180 mm, 190 mm, 200 mm, 210 mm, 220 mm, 230 mm, 240 mm, 250 mm, 260 mm, 270 mm, 280 mm, 290 mm, 300 mm, 310 mm, 320 mm, 330 mm, 340 mm, 350 mm, 360 mm, 370 mm, 380 mm, 390 mm, or 400 mm.

In certain embodiments, thickness 14 may range from about 3.0 mm to about 10 mm, and may be less than about 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 638 mm, 6.9 mm, 7.0 mm, 7.1 mm, 7.2 mm, 7.3 mm, 7.4 mm, 7.5 mm, 7.6 mm, 7.7 mm, 7.8 mm, 7.9 mm, 8.0 mm, 8.1 mm, 8.2 mm, 8.3 mm, 8.4 mm, 8.5 mm, 8.6 mm, 8.7 mm, 8.8 mm, 8.9 mm, 9.0 mm, 9.1 mm, 9.2 mm, 9.3 mm, 9.4 mm, 9.5 mm, 9.6 mm, 9.7 mm, 9.8 mm, 9.9 mm, or 10.0 mm.

Figure 5:
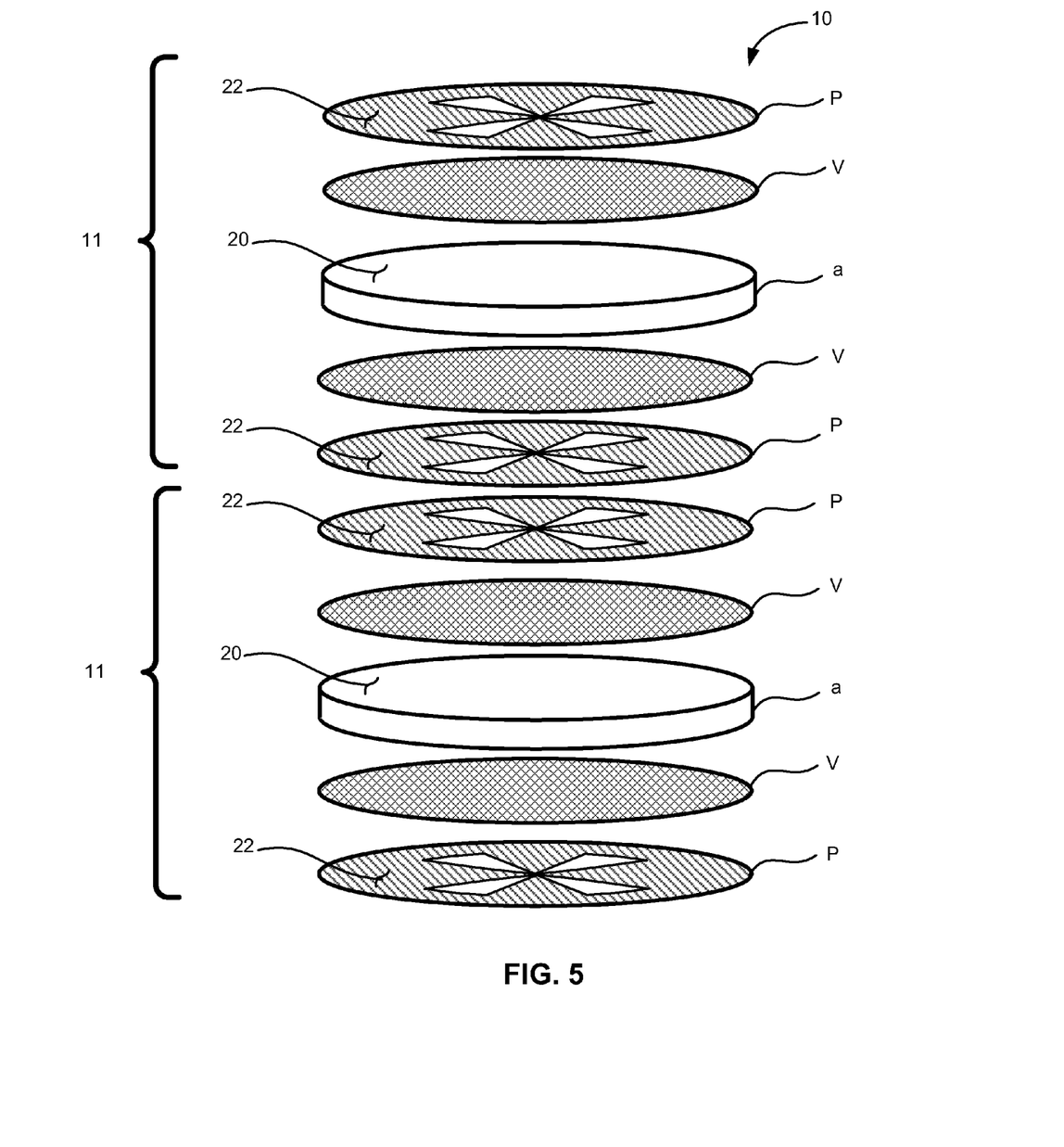
FIG. 5 illustrates an exploded view of embodiments of an abrasive article having an ISO Type 1 shape and comprising two stacks.

FIG. 5 shows an exploded view of embodiments of a grinding wheel 10. One skilled in the art will understand that structural features discussed with respect to these embodiments also apply to embodiments of grinding wheels having other shapes, including those shown in FIGS. 1-4. Shapes have been simplified for clarity, and hole diameter 16 is not shown.

FIG. 5 illustrates embodiments of grinding wheel 10 comprising two stacks 11. Each stack 11 comprises an abrasive layer a coupled to a reduction layer P and a mesh layer V. Abrasive layer a, reduction layer P, and mesh layer V have different densities and elastic constants. When these layers are coupled to one another, an acoustic wave band gap is created by using fundamental properties of acoustic waves which scatters or interferes with sound waves. Accordingly, an abrasive article comprising these layers may be quieter than a similar abrasive article that does not comprise these layers. In some embodiments, each abrasive layer a is coupled to two reduction layers P and two mesh layers V.

In various embodiments, each stack 11 may be described according to the arrangement of layers. Non-limiting arrangements of stacks 11 may include PVaVP, VaVP, VPaPV, VaVPP, VaPPV, aVPP, aPPV, aVP or aPV. In various embodiments, stacks 11 may be identical to each other, while in other embodiments, stacks 11 are different from each other. For example, in one embodiment, grinding wheel 10 may comprise a first stack in a first arrangement and second stack in a second arrangement, where the first arrangement is different from the second arrangement.

Figure 6:
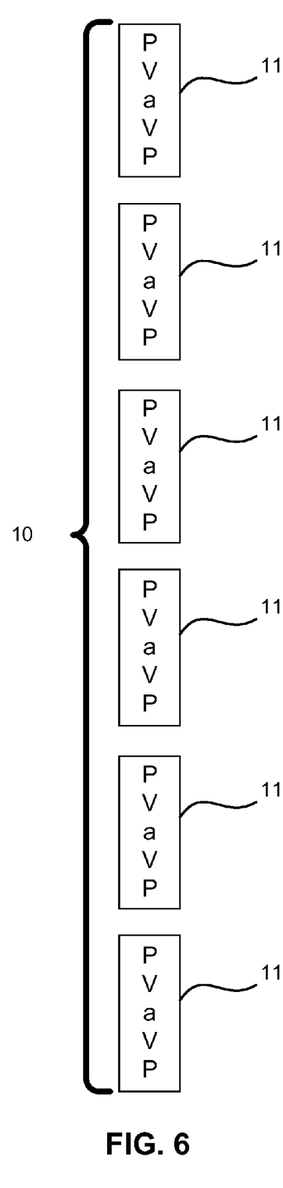
FIG. 6 illustrates a schematic view of embodiments of an abrasive article comprising six stacks.

Each abrasive layer a comprises two faces 20. Reduction layer P and mesh layer V are coupled to one or both faces 20 of abrasive layer a such that mesh layer V is between reduction layer P and abrasive layer a. Embodiments of grinding wheel 10 comprising two stacks 11 may further be described according to the order of layers, such as PVaVPPVaVP. Other embodiments of grinding wheel 10 may have three, four, five, six, seven, eight, nine, ten, eleven, twelve, thirteen, fourteen, fifteen, sixteen, seventeen, eighteen, nineteen, twenty or more such stacks 11. As shown in FIG. 6, certain preferred embodiments comprise six stacks 11, layered as follows: PVaVP-PVaVPPVaVPPVaVPPVaVPPVaVP.

Figure 7:
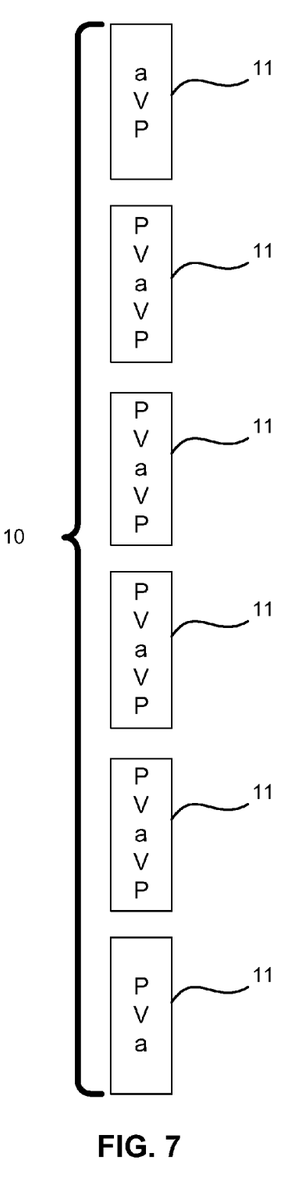
FIG. 7 illustrates a schematic view of embodiments of an abrasive article comprising six stacks.

In certain embodiments, as shown in FIG. 7, topmost and bottommost mesh layers V
and reduction layers P may be omitted. For example, an embodiment comprising six stacks 11 may be layered as follows: aVPPVaVPPVaVPPVaVPPVaVPPVa.

Figure 8:
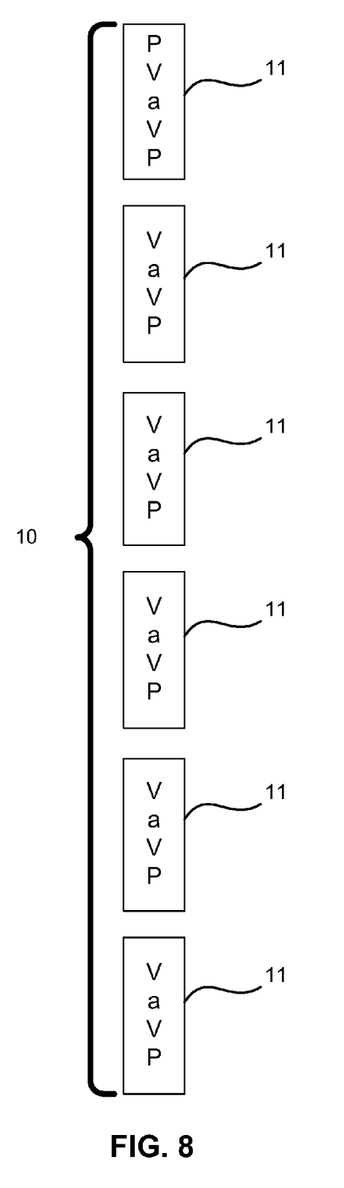
FIG. 8 illustrates a schematic view of embodiments of an abrasive article comprising six stacks.

In other embodiments, as shown in FIG. 8, some stacks 11 may be coupled to one mesh layer V and one reduction layer P, while others may be coupled to two mesh layers V and two reduction layers P. For example, an embodiment comprising six stacks 11 may be layered as follows: PVaVPPaVPPaVP-PaVPPaVPPVaVP.

The surface area of one face 22 of reduction layer P is less than the surface area of one face 20 of abrasive layer a. The surface area of one face of either reduction layer P or abrasive layer a will be referred to as "surface area" for clarity and ease of reading. The term "surface area" as used below refers only to the surface area of one face of reduction layer P or abrasive layer a, and is not meant to refer to the surface area of an entire volume (e.g., the sum of the surface area of two faces and the circumferential surface of abrasive layer a).

In preferred embodiments, the surface area of reduction layer P is expressed as a percentage of the surface area of abrasive layer a. The percentage of the surface area of reduction layer P relative to abrasive layer a may also be expressed as "coverage." For example, an embodiment of reduction layer P whose surface area is 30% of the surface area of abrasive layer a has 30% coverage. An embodiment of reduction layer P whose surface area is equal to the surface area of abrasive layer a has 100%, or "full," coverage. In certain embodiments, reduction layer P has coverage ranging from between about 25% to about 80%, and may have coverage less than about 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%.

One preferred method of ascertaining the coverage of reduction layer P involves a simple correlation of weight to area, assuming constant density across reduction layer P. The weight ratio of a reduction layer P having less than full coverage to a reduction layer having full coverage should be approximately the same as the area ratio between the two. For example, a reduction layer with partial coverage that weighs about 30% as much as a reduction layer with full coverage also has about 30% of the surface area of the reduction layer with full coverage, within acceptable margins of error.

With respect to the composition of abrasive layer a, suitable abrasive grains that can be employed include, for example, alumina-based abrasive grains. As used herein, the term "alumina," "A h03" and "aluminum oxide" are used interchangeably. Many alumina-based abrasive grains are commercially available and special grains can be custom made. Specific examples of suitable alumina-based abrasive grains which can be employed in the present invention include white alundum grain, designated as "38A grain", from Saint-Gobain Ceramics & Plastics, Inc. or pink alundum, designated as "86A grain", from Treibacher Schleifmittel, AG, mono-crystal alumina, coated or non-coated brown fused alumina, heat treated alumina, silicon carbide or combinations thereof. Other abrasive grains such as, for instance, seeded or unseeded sintered sol gel alumina, with or without chemical modification, such as rare earth oxides, MgO, and the like, alumina-zirconia, boron-alumina, silicon carbide, diamond, cubic boron nitride, aluminum-oxynitride, and others, as well as combinations of different types of abrasive grains also can be utilized. In one implementation, at least a portion of the grains employed are wear-resistant and anti-friable alumina-zirconia grains produced by fusing zirconia and alumina at high temperatures (e.g., 1950° C.). Examples of such grains are available from Saint-Gobain Corporation under the designation of ZF® and NZ. The wear-resistant and anti-friable alumina-zirconia grains can be combined, for example, with sintered bauxite (e.g., 76A) grains, ceramic coated fused alumina (e.g., U57A) grains, fused aluminum oxide grains special alloyed with C and MgO and having angular grain shape (e.g., obtained from Treibacher Schleifmittel, AG under the designation of KMGSK and other abrasive materials). Abrasive grains also can be made from other suitable inorganic materials such as oxides, carbides, nitrides, borides, or any combination thereof.

The size of abrasive grains often is expressed as a grit size, and charts showing a relation between a grit size and its corresponding average particle size, expressed in microns or inches, are known in the art as are correlations to the corresponding United States Standard Sieve (USS) mesh size. Grain size selection depends upon the application or process for which the abrasive tool is intended. Suitable grit sizes that can be employed in various embodiments of the present invention range, for example, from about 16 (corresponding to an average size of about 1660 micrometers (μm)) to about 220 (corresponding to an average size of about 32 μm). Different sizes also can be used. Various grain shapes (spherical, elongated, irregular and others) or combinations of shapes can be utilized.

Abrasive layer a, reduction layer P, and mesh layer V may be bonded together. In specific implementations of the present invention, the bond is an organic bond, also referred to as a "polymeric" or "resin" bond, typically obtained by curing a bonding material. An example of an organic bonding material that can be employed to fabricate bonded abrasive articles includes one or more phenolic resins. Such resins can be obtained by polymerizing phenols with aldehydes, in particular, formaldehyde, paraformaldehyde or furfural. In addition to phenols, cresols, xylenols and substituted phenols can be employed. Comparable formaldehyde-free resins also can be utilized.

Among phenolic resins, resoles generally are obtained by a one step reaction between aqueous formaldehyde and phenol in the presence of an alkaline catalyst. Novolac resins, also known as two-stage phenolic resins (often blended with curing agents) generally are produced under acidic conditions and in the presence of a cross-linking agent, such as hexamethylenetetramine (often also referred to as "hexa").

The bonding material can contain more than one phenolic resin, e.g., at least one resole and at least novolac-type phenolic resin. In many cases, at least one phenol-based resin is in liquid form. Suitable combinations of phenolic resins are described, for example, in U.S. Pat. No. 4,918,116 to Gardziella, et al., the entire contents of which are incorporated herein by reference.

Examples of other suitable organic bonding materials include epoxy resins, polyester resins, polyurethanes, polyester, rubber, polyimide, polybenzimidazole, aromatic polyamide, modified phenoolic resins (such as: epoxy modified and rubber modified resins, or phenolic resin blended with plasticizers etc.), and so forth, as well as mixtures thereof. In a specific implementation, the bond includes phenolic resin.

The mixture can also include fillers, curing agents and other compounds typically used in making organic-bonded abrasive articles. Any or all of these additional ingredients can be combined with the grains, the bonding material or with a mixture of grain and bonding material.

Fillers may be in the form of a finely divided powder, granules, spheres, fibers or some otherwise shaped materials. Examples of suitable fillers include sand, silicon carbide, bubble alumina, bauxite, chromites, magnesite, dolomites, bubble mullite, borides, titanium dioxide, carbon products (e.g., carbon black, coke or graphite), wood flour, clay, talc, hexagonal boron nitride, molybdenum disulfide, feldspar, nepheline syenite, various forms of glass such as glass fiber and hollow glass spheres and others. Mixtures of more than one filler are also possible. Other materials that can be added include processing aids, such as: antistatic agents or metal oxides, such as lime, zinc oxide, magnesium oxide, mixtures thereof and so forth; and lubricants, e.g., stearic acid and glycerol monostearate, graphite, carbon, molybdenum disulfide, wax beads, calcium carbonate, calcium fluoride and mixtures thereof. Note that fillers may be functional (e.g., grinding aids such as lubricant, porosity inducers, and/or secondary abrasive grain) or more inclined toward non-functional qualities such as aesthetics (e.g., coloring agent). In a specific implementation, the filler includes potassium fluoroborate and/or manganese compounds, e.g., chloride salts of manganese, for instance an eutectic salt made by fusing manganese dichloride ($MnCl_2$) and potassium chloride (KCl), available, from Washington Mills under the designation of MKCS.

In many instances the amount of filler is in the range of from about 5 and about 30 parts by weight, based on the weight of the entire composition. In the case of abrasive layers a, the level of filler material can be in the range of about 5 to 20 parts by weight, based on the weight of the abrasive layer a.

In specific embodiments the abrasive grains are fused alumina-zirconia abrasives, alundum abrasives, and the bond includes phenolic resins and fillers.

Curing or cross-linking agents that can be utilized depend on the bonding material selected. For curing phenol novolac resins, for instance, a typical curing agent is hexa. Other amines, e.g., ethylene diamine; ethylene triamine; methyl amines and precursors of curing agents, e.g., ammonium hydroxide which reacts with formaldehyde to form hexa, also can be employed. Suitable amounts of curing agent can be in the range, for example, of from about 5 to about 20 parts by weight of curing agent per hundred parts of total phenol novolac resin.

Effective amounts of the curing agent that can be employed usually are about 5 to about 20 parts (by weight) of curing agent per 100 parts of total novolac resin. Those of ordinary skill in the area of resin-bound abrasive articles will be able to adjust this level, based on various factors, e.g., the particular types of resins used; the degree of cure needed, and the desired final properties for the articles: strength, hardness, and grinding performance. In the preparation of abrasive wheels, a preferred level of curing agent is about 8 parts to about 15 parts by weight.

The abrasive layer a, or mix layer(s) thereof, can be formed to include at least 20 vol % bond material of the total volume of the wheel (or a specific mix layer). A greater content of bond material, such as at least about 30 vol % at least about 40 vol %, at least about 50 vol %, or even at least about 60 vol % can be utilized. With respect to abrasive grains, the abrasive layer a (or a given mix layer thereof) contains at least about 20 vol % abrasive grains, e.g., at least about 35 vol %, at least about 45 vol %, at least about 55 vol %, at least about 60 vol %, or at least about 65 vol %.

The reinforced bonded abrasive articles described herein can be fabricated to have a desired porosity. The porosity can be set to provide a desired wheel performance, including parameters such as wheel hardness, strength, and initial stiffness, as well as chip clearance and swarf removal. Porosity can be uniformly or non-uniformly distributed throughout the body of the wheel and can be intrinsic porosity, obtained by the arrangement of grains within the bond matrix, shape of the abrasive grains and/or bond precursors being utilized, pressing conditions and so forth, or can be generated by the use of pore inducers. Both types of porosity can be present.

The porosity can be closed and/or interconnected (open). In "closed" type porosity void pores or cells generally do not communicate with one another. In contrast, "open" porosity presents pores that are interconnected to one another. Examples of techniques that can be used for inducing closed and interconnected porosities are described in U.S. Pat. Nos. 5,203,886, 5,221,294, 5,429,648, 5,738,696 and 5,738,697, 6,685,755 and 6,755,729, each of which is herein incorporated by reference in its entirety.

Finished bonded abrasive articles may contain porosity within the range of from about 0 vol % to about 40 vol % (based on the total volume of the article). In some implementations, the porosity of abrasive wheels described herein (or of a mix layer thereof) is within the range of from about 0 vol % to about 30 vol %, e.g., not greater than 25 vol %, often not greater than about 20 vol %, such as not greater than about 15 vol %, about 10 vol %, or not greater than about 5 vol %. In particular instances, the porosity is within a range between about 1 vol % and about 25 vol %, such as between about 5 vol % and 25 vol %.

Abrasive layer a may comprise abrasive layers of known composition (e.g., abrasive grains bound together by an adhesive).

Mesh layer V may comprise a mesh or weave comprising cloth, fiber, polymer, or other suitable material.

Reduction layer P may be a sheet having a thickness that may range from 25 micrometer to 1 mm. Reduction layer P may comprise polytetrafluoroethylene (PTFE), epoxy, thermosets, thin polymer sheet, polymer sheet with inert coating, non-woven fiber mat, or paper. Reduction layer P can sustain baking temperature of abrasive articles (about 140° C. to about 230° C.).

Because the surface area of the reduction layers P will always be less than the surface area of abrasive layer a, and because mesh layer V includes interstices, at least a portion of abrasive layers a of adjacent stacks 11 are chemically bonded (or chemically adhered) to one another. Chemical bonding between adjacent abrasive layers a lends an additional measure of strength to abrasive article 10.

EXAMPLES

Examples demonstrating the improved mechanical properties and noise-reduction capabilities of the abrasive article will be discussed. First, a specific example demonstrating the improved rupture force, strength, and side load resistance will be discussed.

To determine the rupture strength, force, and side load resistance of embodiments of the abrasive article, an Instron machine can be utilized to apply a load of, for example, at a rate of 4.5 mm/min or higher at a region adjacent to the central opening till the macro-fracture of the abrasive article occurred. During the rupture testing, while a force is being applied, a cylindrical support is contacting the working surface of the abrasive article. The cylindrical support contacts the abrasive article throughout a full circumference at a location on the working surface closest to the peripheral edge of the abrasive article that defines a surface between the working surface and top surface. As the load is applied, the applied force can be collected by a computer. When the article finally breaks, the fracture force at the moment of breaking the abrasive article is recorded. Five groups of 125 (OD)×7 (thickness)×22.3 (ID) mm depressed center wheels were made. All articles made with the same formulation of 47 volume percent of ceramic-coated brown fused alumina and 53 volume percent of bond including liquid resin (13.8 volume of percent), powder resin (24.9 volume percent), and inorganic fillers. The mesh layer V (reinforcement) was made with E glass with density of 81 g/m2 from IPAC Fabrics Inc. in Shrewsbury, Mass., USA. The layer P was made of cellular paper with a thickness of 0.2 mm. The reference of depressed center wheel was made without any reduction layers P with a construction as follows: VaVaVaVaVaV. The other four groups of depressed center wheels were made with five stacks as follows: VaVPPVaVPPVaVPPVaVPPVaV.

prised an abrasive layer a, two mesh layers V, and two reduction layers P, arranged as PVaVP. Reduction layers P in each of the three embodiments had 30% coverage, 50% coverage, and 75% coverage respectively.

Noise level (dB) was measured with a Class 1 sound meter (Brüel & Kjoeer Type 2250) using BZ-7222 software, according to the standardized test IEC 61672-1 (International Electrotechnical Convention). The sound meter was placed on a metal tripod one meter above the ground level and one meter away from the operating location in a room at 25° C. The workpiece material for testing comprised 304 stainless steel. Abrasive articles were fitted to a 1300 W Bosch GWS-10 angle grinder, which was operated at 11000 rpm. The recorded noise level is an average of the weighted noise level dB(A) over a 5 Hz-20 kHz frequency band for 30 seconds of grinding time.

In specific instances, the abrasive articles demonstrated a reduction in noise (i.e., relative change in noise during grinding) of at least about 1 dB as compared to a conventional abrasive article. The noise reduction (NR) can be represented by the equation NR=[dBc−dBn], wherein dBc is the decibels of the conventional abrasive article dBn is the measured noise in decibels of an abrasive article according to an embodiment as measured in the conditions noted herein. Testing results appear in the table below:

| Coverage | Group 1—Reference | Group 3—75% Coverage | Group 4—50% Coverage | Group 5—30% Coverage |
|---|---|---|---|---|
| NR | 0 dB | −6.35 dB | −5.82 dB | −5.65 dB |

As coverage (i.e., surface area) of the reduction layer P increased, the decibel level of the abrasive article decreased. The following paragraphs enumerated consecutively from 1 through 24 provide for various aspects of the present invention. In one embodiment, in a first paragraph (1), the present invention provides an abrasive article comprising: three stacks coupled to one another, each stack comprising an abrasive layer coupled to a mesh layer and a reduction layer, where the surface area of one face of the reduction layer is less than the surface area of the abrasive layer and at least a portion of the abrasive layers of each stack are chemically bonded to one another.

|  | Group 1—Reference | Group 2—100% Coverage | Group 3—75% Coverage | Group 4—50% Coverage | Group 5—30% Coverage |
|---|---|---|---|---|---|
| Construction | VaVaVaVaVaV | VaVP1P1VaVP1P1VaVP1P1VaVP1P1VaV | VaVP2P2VaVP2P2VaVP2P2VaVP2P2VaV | VaVP3P3VaVP3P3VaVP3P3VaVP3P3VaV | VaVP4P4VaVP4P4VaVP4P4VaVP4P4VaV |
| Rupture force (N) | 3908.4 | 1288.4 | 2810.8 | 3408.0 | 3586.0 |

Experimental results indicated that the rupture strength or side-load resistance of the abrasive article can be improved by reducing the coverage of the reduction layer P.

Second, a specific example of the noise-reduction capabilities of embodiments of the abrasive article will be discussed.

A conventional abrasive article comprising five abrasive layers a and no reduction layers was used as the baseline measurement. Three embodiments of the disclosed abrasive article 10, having identical dimensions as the conventional, were constructed with five stacks 11. Each stack 11 com- (2) The abrasive article of paragraph 1, where the abrasive article comprises a diameter between about 100 mm and about 400 mm.

(3) The abrasive article of paragraph 1, where the abrasive article comprises a thickness between about 3 mm to about 10 mm.

(4) The abrasive article of paragraph 1, where the surface area of one face of the reduction layer is between about 25% and about 80% of the surface area of one face of the abrasive layer.

(5) The abrasive article of paragraph 1, where the reduction layer comprises paper.

(6) The abrasive article of paragraph 1, where the reduction layer comprises PTFE.

(7) The abrasive article of paragraph 1, where the reduction layer comprises non-woven fiber mat.

(8) The abrasive article of paragraph 1, where the reduction layer comprises a thermoset.

(9) The abrasive article of paragraph 1, where the reduction layer comprises a polymer sheet with inert coating.

(10) An abrasive article comprising:
two abrasive layers; and
a reduction layer between the abrasive layers;
where the surface area of one face of the reduction layer is less than the surface area of one face of an abrasive layer and at least a portion of the abrasive layers are chemically bonded to one another.

(11) The abrasive article of paragraph 10, where the abrasive article comprises a diameter between about 100 mm and about 400 mm.

(12) The abrasive article of paragraph 10, where the abrasive article comprises a thickness between about 3 mm to about 10 mm.

(13) The abrasive article of paragraph 10, where the surface area of one face of the reduction layer is between about 25% and about 80% of the surface area of one face of the abrasive layer.

(14) The abrasive article of paragraph 10, where the reduction layer comprises paper.

(15) The abrasive article of paragraph 10, where the reduction layer comprises PTFE.

(16) The abrasive article of paragraph 10, where the reduction layer comprises non-woven fiber mat.

(17) The abrasive article of paragraph 10, where the reduction layer comprises a thermoset.

(18) The abrasive article of paragraph 10, where the reduction layer comprises a polymer sheet with inert coating.

(19) An abrasive article comprising:
two stacks, each stack comprising:
an abrasive layer comprising two faces, where each face comprises a surface area;
two mesh layers, where one mesh layer is coupled to each face of the abrasive layer;
two reduction layers, where one reduction layer is coupled to each mesh layer and each face of the abrasive layer, and where the surface area of each reduction layer is less than the surface area of one face of the abrasive layer;
where the stacks are coupled together such that at least a portion of the abrasive layers are bonded to one another.

(20) The abrasive article of paragraph 19, where the abrasive article comprises a diameter between about 100 mm and about 400 mm.

(21) The abrasive article of paragraph 19, where the abrasive article comprises a thickness between about 1.6 mm to about 10 mm.

(22) The abrasive article of paragraph 19, where the surface area of one face of the reduction layer is between about 25% and about 80% of the surface area of one face of the abrasive layer.

(23) The abrasive article of paragraph 19, where the reduction layer comprises paper.

(24) The abrasive article of paragraph 19, where the reduction layer comprises PTFE.

(25) The abrasive article of paragraph 19, where the reduction layer comprises non-woven fiber mat.

(26) The abrasive article of paragraph 19, where the reduction layer comprises a thermoset.

(27) The abrasive article of paragraph 19, where the reduction layer comprises a polymer sheet with an inert coating.

(28) An abrasive article comprising:
a first stack comprising an abrasive layer coupled to a mesh layer and a reduction layer, where the surface area of one face of the reduction layer is less than the surface area of the abrasive layer, and the layers are ordered in a first arrangement; and
a second stack coupled to the first stack, the second stack comprising an abrasive layer coupled to a mesh layer and a reduction layer, where the surface area of one face of the reduction layer is less than the surface area of the abrasive layer, and the layers are ordered in a second arrangement;
where the first arrangement is different than the second arrangement.

(29) An abrasive article comprising:
a first stack comprising an abrasive layer a coupled to a mesh layer V and a reduction layer P, where the surface area of one face of the reduction layer P is less than the surface area of the abrasive layer a, and the layers are ordered in a first arrangement selected from the group PVaVP, VaVP, VPaPV, VaVPP, VaPPV, aVPP, aPPV, aVP or aPV;
and a second stack coupled to the first stack, the second stack comprising an abrasive layer a coupled to a mesh layer V and a reduction layer P, where the surface area of one face of the reduction layer P is less than the surface area of the abrasive layer a, and the layers are ordered in a second arrangement a second arrangement selected from the group PVaVP, VaVP, VPaPV, VaVPP, VaPPV, aVPP, aPPV, aVP or aPV;
where the first arrangement is different than the second arrangement.

It should be understood that the present devices and methods are not intended to be limited to the particular forms disclosed. Rather, they are to cover all modifications, equivalents, and alternatives falling within the scope of the claims.

The claims are not to be interpreted as including means-plus- or step-plus-function limitations, unless such a limitation is explicitly recited in a given claim using the phrase(s) "means for" or "step for," respectively.

We claim:

1. An abrasive article comprising:
a first stack comprising an abrasive layer a coupled to a mesh layer V and a reduction layer P, where the surface area of one face of the reduction layer P is less than the surface area of the abrasive layer a, and the layers are ordered in a first arrangement selected from the group PVaVP, VaVP, VPaPV, VaVPP, VaPPV, aVPP, aPPV, aVP or aPV; and
a second stack coupled to the first stack, the second stack comprising an abrasive layer a coupled to a mesh layer V and a reduction layer P, where the surface area of one face of the reduction layer P is less than the surface area of the abrasive layer a, and the layers are ordered in a second arrangement selected from the group PVaVP, VaVP, VPaPV, VaVPP, VaPPV, aVPP, aPPV, aVP or aPV;
where the first arrangement is different than the second arrangement.

2. The abrasive article of claim 1, where the surface area of one face of the reduction layers is less than 75% of the surface area of one face of the abrasive layers.

3. The abrasive article of claim 1, where the surface area of one face of the reduction layers is less than 75% of the surface area of one face of the abrasive layers.

4. The abrasive article of claim 1, where the surface area of one face of the reduction layers is less than 50% of the surface area of one face of the abrasive layers.

5. The abrasive article of claim 1, where the reduction layers comprise polytetrafluoroethylene.

6. The abrasive article of claim 1, where the first arrangement is VaVPP.

7. The abrasive article of claim 1, where the second arrangement is VaVPP.

8. The abrasive article of claim 1, where the first arrangement is VaVP and the second arrangement is PVaVP.

9. The abrasive article of claim 1, where the abrasive article comprises a diameter between about 100 mm and about 400 mm.

10. The abrasive article of claim 1, where the abrasive article comprises a thickness between about 3 mm to about 10 mm.

11. The abrasive article of claim 1, where the surface area of one face of the reduction layers is between about 25% and about 80% of the surface area of one face of the abrasive layers.

12. The abrasive article of claim 1, where the reduction layers comprise paper.

13. The abrasive article of claim 1, where the reduction layers comprise PTFE.

14. The abrasive article of claim 1, where the reduction layers comprise non-woven fiber mat.

15. The abrasive article of claim 1, where the reduction layers comprise a polymer sheet with inert coating.

16. The abrasive article of claim 1, where the reduction layers comprise a thermoset.

17. The abrasive article of claim 1, where the reduction layers comprise paper.

18. The abrasive article of claim 1, where the reduction layers comprise PTFE.

19. The abrasive article of claim 1, where the reduction layers comprise non-woven fiber mat.

20. The abrasive article of claim 1, where the reduction layers comprise a polymer sheet with inert coating.

\* \* \* \* \*